United States Patent [19]

Lorch

[11] Patent Number: 4,508,294

[45] Date of Patent: Apr. 2, 1985

[54] AIR BAG RESTRAINT SYSTEM

[75] Inventor: Daniel L. Lorch, Holland, Pa.

[73] Assignee: The United States of America as represented by the Secretary of the Navy, Washington, D.C.

[21] Appl. No.: 490,827

[22] Filed: May 2, 1983

[51] Int. Cl.³ .................................. B64D 25/04
[52] U.S. Cl. .................. 244/122 AG; 297/488; 280/733
[58] Field of Search ....... 244/122 R, 122 A, 122 AG, 244/122 B, 121, 141; 280/733, 728, 730, 734, 735, 748, 749, 751; 297/466, 465, 487, 488

[56] References Cited

U.S. PATENT DOCUMENTS

| 2,733,027 | 1/1956 | Gero ........................ 244/122 A |
| 3,218,103 | 11/1965 | Boyce ..................... 244/122 AG |
| 3,243,822 | 4/1966 | Lipkin . |
| 3,271,797 | 9/1966 | Boyce . |
| 3,287,064 | 11/1966 | Freeman . |
| 3,430,979 | 3/1969 | Terry et al. ........................ 280/733 |
| 3,623,768 | 11/1971 | Capener et al. . |
| 3,672,609 | 6/1972 | Hawkins . |
| 3,698,670 | 10/1972 | Ewing . |
| 3,753,576 | 8/1973 | Gorman . |
| 3,827,716 | 8/1974 | Vaughn et al. . |
| 3,905,615 | 9/1975 | Schulman . |
| 3,953,049 | 4/1976 | Surace ........................ 244/122 AG |
| 4,215,835 | 8/1980 | Wedgwood ................. 244/122 AG |

FOREIGN PATENT DOCUMENTS 1301867 1/1973 United Kingdom ................ 280/730
1369860 10/1974 United Kingdom ........ 244/122 AG Primary Examiner—Galen L. Barefoot
Attorney, Agent, or Firm—Robert F. Beers; Henry Hansen; Armand M. Vozzo, Jr.

[57] ABSTRACT

An air bag restraint system is disclosed for protecting an occupant in a seat during ejection from a vehicle, particularly an aircraft. In one preferred embodiment, an air bag member is deployed from a stored position frontally to the chest of the occupant and guided upward and downward along tracks on either side of the seat so that the upper body of the occupant is enclosed within the seat just prior to ejection. In another preferred embodiment, the air bag is stowed within a cover about a semicircular hoop releasably connected to the seat about the chest of the occupant. At the initiation of the ejection sequence, the cover is released and the air bag inflated, expanded into the proper shape by external restraint straps, so that the head, arms and torso of the occupant are encapsulated at the time of ejection.

7 Claims, 4 Drawing Figures

AIR BAG RESTRAINT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to vehicle occupant restraint systems and more particularly to an improved air bag restraint system for protecting the occupant in the seat of a high-speed vehicle during emergency seat ejection.

In the flight of high-performance aircraft, emergency ejection of the pilot and other aircrewmen runs the substantial risk of critical personal injury and loss of life due to the high speeds of ejection and the high-acceleration or Q forces to which the ejected occupants are exposed. In the typical upward acceleration of the ejection seat, severe head, neck and vertibral injuries are likely to occur unless the head and upper body of the occupant is properly positioned just prior to ejection, and the head and neck sufficiently restrained to prevent rotation during the ejection sequence. In addition, windblasts of up to 1600 pounds per square foot are usually applied to the occupant upon ejection and can cause serious limb flail injuries, dislocating arms and legs of the occupant if improperly positioned or insufficiently restrained.

Various occupant restraint systems have performed satisfactorily the separate tasks of head and torso positioning, neck and limb retention, and high Q protection for aircraft ejection operations. None of the existing systems, however, have been able to afford complete protection for the ejected aircrewman witnout becoming too complicated and costly or without unduly interfering with normal control operations of the crewman.

SUMMARY OF THE INVENTION

Accordingly, it is general purpose and object of the present invention to provide an improved restraint system for protecting the occupant of a high-speed vehicle during emergency ejection.

A more particular object of the present invention is to provide an ejection restraint system for high-performance aircraft that reduces the risks of high-Q and windblast injuries to an aircrewman during ejection.

A further object of the present invention is to provide an ejection seat restraint for an aircrewman that both maintains proper position of the head, neck and torso of the aircrewman just prior to and during ejection, and sufficiently restrains the arms and upper body without interfering with normal aircraft operation.

A still further object of the present invention is to provide an ejection restraint system that is safe and reliable in performance, relatively inexpensive to fabricate and install, and easily retrofittable to existing ejection seats.

Briefly, these and other objects of the present invention are accomplished by an air bag restraint system for protecting an occupant in a seat during ejection from a vehicle, particularly an aircraft. In one preferred embodiment, an air bag member is folded and stored upon a central support band positioned frontally to the chest of the occupant. Above and below the central support band, a series of cable members slidably connected at their ends to tracks on either side of the seat are fastened about the air bag member to restrain the air bag member and guide its movement along the tracks upward and downward from the central support band upon deployment. At the initiation of the ejection sequence, the air bag member is inflated and deployed along the tracks to enclose the upper body of the occupant within the seat thereby positioning and restraining his head, arms and torso against the seat for ejection. Subsequent to ejection from the vehicle, the tracks are automatically released and the air bag removed.

In another preferred embodiment, a semi-circular hoop releasably locked into an ejection seat about the chest of the occupant is formed from an air bag member folded within a cover wrapped about a flexible band and closed by a series of interconnected loops. Just prior to the start of the ejection sequence, the cover is automatically released and the air bag is inflated, shaped by a plurality of restraint straps fastened to the external surface of the bag, so that the head, arms and torso of the occupant are encapsulated at the time of ejection. Subsequent to ejection and the exposure to windblast and high-Q forces, the hoop is automatically released from the seat thereby removing the air bag from about the occupant.

For a better understanding of these and other aspects of the present invention, reference may be made to the following detailed description taken in conjunction with the accompanying drawing in which like reference numerals designate like parts throughout the figures thereof.

DESCRIPTION OF THE PREFERRED EMBODIMENT

Figure 1A:
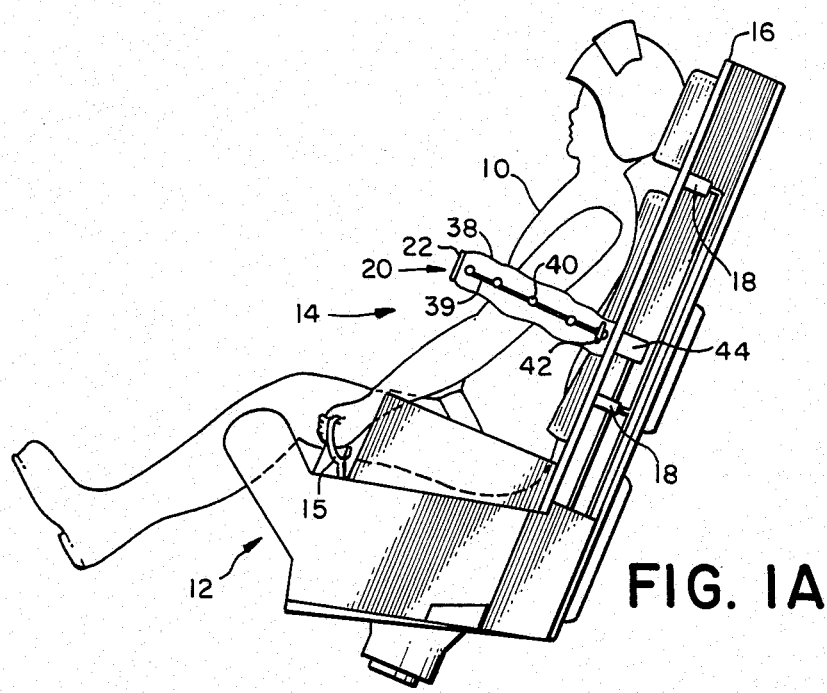
FIGS. 1A and 1B are side views of a crewman in the ejection seat of an aircraft, showing one preferred embodiment of the air bag restraint system of the present invention in normal and deployed conditions, respectively.
Figure 1B:
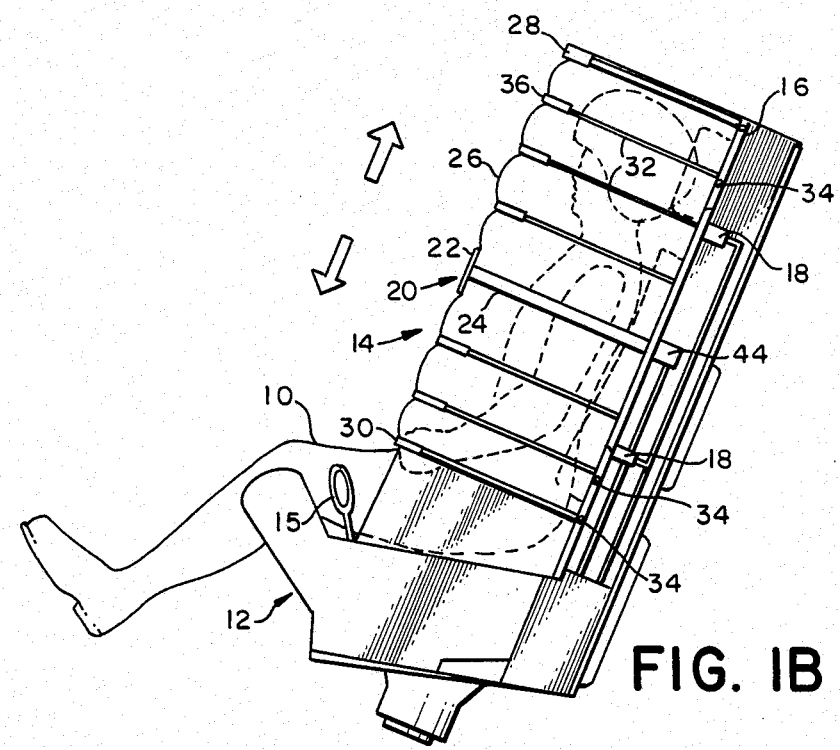

Referring now to FIGS. 1A and 1B, there is shown a crewman 10 seated in a conventional aircraft ejection seat 12 equipped with an ejection control handle 15 used to manually initiate the ejection sequence and an air bag restraint system generally designated 14, in accordance with the present invention. Restraint system 14 comprises a pair of longitudinal track members 16 parallelly disposed at the back of seat 12 on either side of crewman 10. Having sufficient length to extend along the head, neck and torso of crewman 10, each of the track members 16 is mounted on the back of seat 12 and maintained in their respective positions via controlled coupling devices 18 that are conventionally employed to disengage automatically upon appropriate actuation. The coupling devices 18 are connected to ejection sequence controls (not shown) in seat 12 and, as discussed in further detail hereinafter, are designed to be actuated shortly after actual ejection from the vehicle in order to remove the restraint system 14 from the seat.

A rigid support frame 20, better shown in FIG. 1B, is formed having a U-shaped configuration and is mounted along the track members 16 substantially perpendicular thereto so that the support frame extends around the crewman 10 forward of seat 12 at approximately chest level. Although it may be of one-piece construction, support frame 20 is shown being comprised of a front plate 22 that is positioned just forward of the chest of crewman 12 upon a pair of side arms 24, one of the ends of which are secured to the front plate while the opposite ends are adapted to be mounted to repsective track members 16. It should be understood that in order to permit the crewman 10 easier ingress and egress from seat 12, the mounting connections between support frame 20, more specifically side arms 24, and track members 16 should be manually releasable at one side of the frame and pivotal, such as hinged, at the opposite side.

An inflatable air bag member 26 fabricated from a strong durable cloth material, such as Kevlar, is attached along a portion of its forward-facing surface to the inside of front plate 22 and is formed having a substantially rectangular shape when folded and deflated. Better shown in FIG. 1B, the air bag member 26 may be internally-reinforced to provide greater strength in an inflated condition and therefore permit the use of higher inflation pressures without injuring the crewman 10. Such reinforcement would also aid in the design of the final shape of the air bag member 26 when fully inflated. It should be noted that since the restraint system 14 is, in accordance with the present invention, to remain deployed about the crewman 10 on seat 12 for only a short period of time, typically no more than about two seconds, the surface of air bag member 26 may be porous so that the air bag retains its final inflated shape for a slightly longer period, for example, about three seconds. Such porous air bag member 26 would also be beneficial in case of inadvertent operation of the restraint system 14, because the crewman 10 would have full control within a short period of time.

Fastened across the forward-facing surface of air bag member 26 and longitudinally spaced apart there along are a plurality of restraint cables 28, 30 and 32 that limit outward expansion of the air bag member. Routed through and retained by respective tunnel loops 36 attached to the forward surface of air bag member 26, the restraint cables 28, 30 and 32 are formed having ball-like members 34 at either end that slidingly fit within the track members 16 to guide displacement of the air bag member upward and downward along the track members. Top and bottom restraint cables 28 and 30, respectively, are fastened near the respective edges of air bag member 26, their sliding movement along track members 16 being stopped at the top and bottom thereof in order to limit displacement of the air bag member. Intermediate restraint cables 32 fastened about the air bag member 36 above and below the central support frame 20 are positioned and spaced apart to guide the directional movement of the air bag member along track members 16 and to help control the final inflated shape of the air bag about crewman 10.

A cover 38 of cloth material similar to that of air bag member 26 is used to enclose and store the air bag member and its associated restraint cables 28, 30 and 32 about support frame 20. The air bag member 20 with cables 28, 30 and 32 are folded from the top and bottom edges of the air bag member and completely wrapped by cover 38. Cover 38 is provided with a series of grommets 40 and nylon loops 39 that are adapted to be passed through the grommets and interlock around the perimeter of the cover to close the cover. A locking pin 42 set through the end loop on either side of cover 38 holds the cover closed until released automatically at the start of the ejection sequence, typically by small pistons mounted at both sides of the cover. A gas generator 44 mounted on seat 12 is adapted to supply air bag member 26, upon actuation with sufficient pressure to fully inflate the air bag within a brief period of time, typically about 0.1 second, and is connected to ejection sequence controls for actuation at the start of the ejection sequence. The gas generator 44 may also be provided with small shunt lines that feed the pistons used to release locking pins 42 and to open cover 38.

In operation, the air bag restraint system 14 is activated through manual actuation of the ejection control handle 15 by crewman 10 when emergency ejection is determined necessary, Upon the initiation of the ejection sequence, cover 38 is opened by releasing locking pins 42 and simultaneously, the air bag member 26 is inflated. During inflation, air bag member 26 is deployed from its stored position on central support frame 20 about the chest of crewman 10, the air bag member being longitudinally displaced upward and downward from the support frame along track members 16 guided and restrained by cables 28, 30 and 32. The air bag member 26 thus encapsulates the upper body of crewman 10, pressing his torso against the seat 12 into proper position for ejection and providing passive restraint of his head, neck and arms during ejection. Shortly after ejection typically upon the sequencing of seat-man separation, coupling devices 18 are actuated via the ejection sequence controls thereby releasing the track members 16 from seat 12 and allowing the entire restraint system 14 to fall clear of the seat.

Figure 2A:
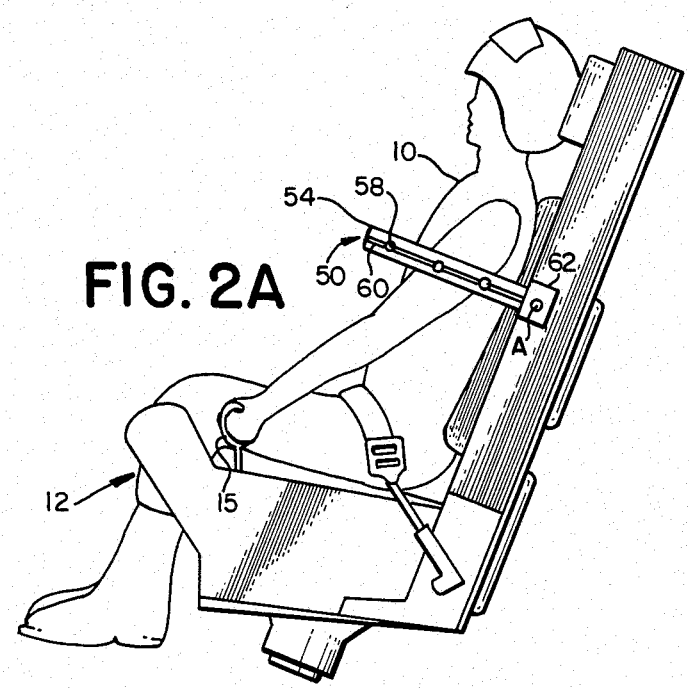
FIGS. 2A and 2B are respective side views of a crewman in an aircraft ejection seat showing the normal and deployed conditions of another preferred embodiment of the air bag restraint system according to the present invention.
Figure 2B:
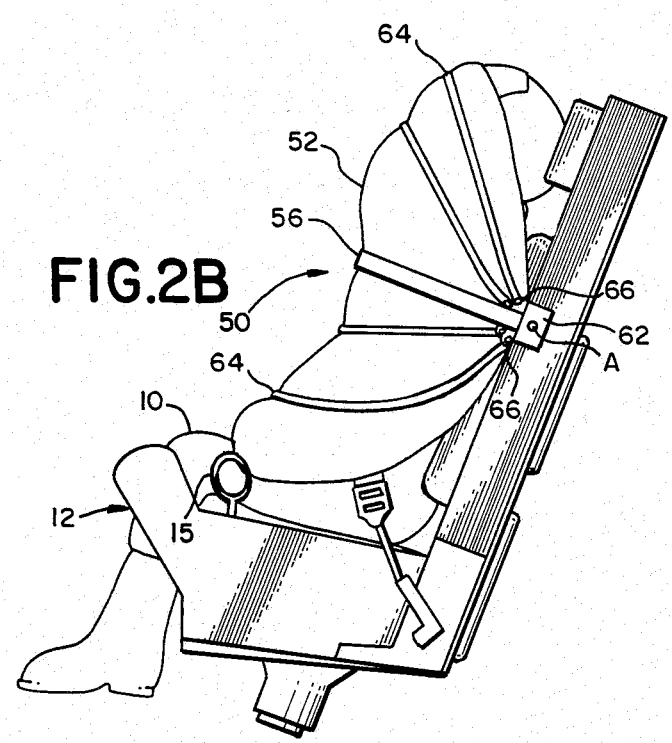

Referring now to FIGS. 2A and 2B, there is shown another preferred embodiment of an air bag restraint system, generally designated 50, for protecting the crewman 10 during an ejection in seat 12. The restraint system 50 comprises an air bag member 52 folded tightly upon a flexible support band 56 and wrapped within a cover 54 into a semicircular hoop-like configuration that is releasably mounted to seat 12 substantially about the chest of crewman 10. Air bag member 52 is fabricated of a similar cloth material as the air bag member 26 of restraint system 14 and may likewise be internally reinforced and porous. Typically, air bag member 52 will have a volume of 2.0–3.0 cubic feet and should fill to a pressure of 2.0 psi or more in a period of less than 0.5 second, being able to retain at least 1.0 psi for a minimum of about 3.0 seconds. It should be noted that standard high-pressure gas generators (not shown) are located inside of air bag member 52 and are controlled to supply sufficient pressure to the air bag for its proper inflation upon initiation of the ejection sequence.

Cover 54 is constructed similarly to the cover 38 of restraint system 14, being likewise provided with a series of grommets 58 and interlocking nylon loops 60 that permit the cover to be tightly-fitted and closed about the folded air bag member 52 on support band 56 and automatically released by unlocking end loops on either side of the cover.

Support band 56 is a thin, elongated strap of a rigid material, such as a stainless steel, providing longitudinal flexibility and transverse support for storing air bag member 52. Having a length sufficient to encircle the chest of crewman 10 from both sides of seat 12, and leaving a space therearound, typically about 6 inches, so as not to impede his normal activities, support band 56 is releasably mounted at both its ends to respective sides of the seat behind the crewman. A coupler 62 attached at either end of support band 56 is adapted to engage the sides of seat 12 along a coupling axis A designed to pass through the seat and coupler and permit disengagement thereof upon appropriate actuation during the ejection sequence.

A plurality of restraint straps 64 fabricated of a strong cloth material are fastened at selected locations along the top and bottom of the forward facing surface of air bag member 52, the straps extending across the air bag from either side of seat 12 to direct proper deployment of the air bag when inflated. Attached to respective ends of restraint straps 64 are fittings 66 that pivotally couple each strap to coupler 62 and, in turn, to seat 12 along axis A at either side of crewman 10 so that the straps fan out from either side of the seat to deploy the inflated air bag member 52 upward and downward from support band 56.

In operation, the air bag restraint system 50, similarly to restraint system 14, is activated manually by crewman 10 using ejection control handle 15 to initiate the ejection sequence. Thereupon, cover 54 is opened in similar fashion as cover 38 thereby releasing air bag member 52 which is simultaneously inflated. During inflation, air bag member 52 is rapidly deployed from its stored position upon support band 56 about the chest of crewman 10, the air bag member being fanned outward from the support band in an upward and downward direction guided by the pivotal movement of restraint straps 64. The air bag member 52 thus encapsulates the upper body of crewman 10, pressing his torso against seat 12 in proper position for ejection and passively restraining his head, neck and arms during ejection. Similarly to restraint system 14, the deployed air bag restraint system 50 is automatically released from seat 12 following ejection, typically upon sequencing of normal seat-man separation. In the case of restraint system 50, coupler 62 on either side of seat 12 is disengaged along coupling axis A thereby allowing the deployed air bag member 52 along with support band 56 to fall clear of the seat.

Therefore, it is apparent that the disclosed air bag restraint systems provide improved protection for the occupant of a high-speed vehicle during emergency ejection, particularly reducing the risks of high-Q and windblast injuries to a crewman during ejection from a high-performance aircraft. The present air bag restraint systems maintain proper position of the head, neck and torso of the crewman just prior to and during ejection, and sufficiently restrain the arms and upper body without interfering with normal aircraft operations. Furthermore, the present air bag systems are safe and reliable in performance, relatively inexpensive to fabricate and install, and easily retrofittable to existing ejection seats.

Obviously, other embodiments and modifications of the present invention will readily come to those of ordinary skill in the art having the benefit of the teachings presented in the foregoing description and drawings. It is therefore to be understood that various changes in the details, materials steps, and arrangement of parts, which have been described and illustrated to explain the nature of the invention, may be made by those skilled in the art within the principle and scope of the invention as expressed in the appended claims.

What is claimed is:

1. A restraint system for protecting an occupant during ejection from a high-performance aircraft, comprising:
    an ejection seat;
    support means releasably mounted to said seat and extended transversely about the chest of the occupant for confining the occupant in a predetermined envelope during all flight maneuvers;
    an inflatable member, attached along the center portion of its forward-facing surface to the chest side of the transverse extension of said support means, normally stored uninflated and tightly folded adjacent to said support means, said inflatable member encapsulating the head, arms and torso of the occupant when inflated;
    a plurality of positioning members coupled at their ends to said support means and coextending transversely about the chest of the occupant, contiguously attached at spaced intervals about the forward-facing surface of said inflatable member, for guiding and restraining the deployment of said inflatable member from the stowed position to the encapsulating position; and
    inflating means operatively connected to said inflatable member for deployment thereof from the stowed position to the encapsulating position.

2. An occupant restraint system according to claim 1 wherein said support means comprises:
    a pair of longitudinal track members releasably mounted to said seat on either side of the occupant; and
    a U-shaped frame mounted, pivotally at one end and releasably at the other end, to said track members and extending transversely therebetween around the chest of the occupant.

3. An occupant restraint system according to claim 2, wherein said positioning members are slidingly coupled to said track members.

4. An occupant restraint system according to claim 3, wherein said inflatable member is porous.

5. An occupant restraint system according to claim 1, wherein said support means comprises:
    a U-shaped frame configured to extend transversely about the chest of the occupant and releasably mounted at both its ends to respective sides of said seat, such mounting points defining a coupling axis passing through said seat; and
    coupling means attached at either end of said frame and formed to engage the sides of said seat along the coupling axis.

6. An occupant restraint system according to claim 5, wherein said positioning members are pivotally coupled to said coupling means to fan said inflatable member outward from said support means in upward and downward directions.

7. An occupant restraint system according to claim 6, wherein said inflatable member is porous.

* * * * *